(12) United States Patent
Pillar et al.

(10) Patent No.: US 8,001,602 B2
(45) Date of Patent: Aug. 16, 2011

(54) DATA SCAN MECHANISM

(75) Inventors: John Pillar, Ottawa (CA); Mark Schellhorn, Ottawa (CA); Timothy Buick, Nepean (CA)

(73) Assignee: Freescale Semiconductor, Inc., Austin, TX (US)

( * ) Notice: Subject to any disclaimer, the term of this patent is extended or adjusted under 35 U.S.C. 154(b) by 1462 days.

(21) Appl. No.: 11/261,480

(22) Filed: Oct. 31, 2005

(65) Prior Publication Data

US 2007/0098113 A1    May 3, 2007

(51) Int. Cl.
*G06F 12/14* (2006.01)
(52) U.S. Cl. .......................................... 726/24; 713/188
(58) Field of Classification Search .............. 726/22–25; 713/188
See application file for complete search history.

(56) References Cited

U.S. PATENT DOCUMENTS

| | | | |
|---|---|---|---|
| 4,843,631 A * | 6/1989 | Steinpichler et al. | 382/280 |
| 5,319,776 A * | 6/1994 | Hile et al. | 726/24 |
| 7,454,418 B1 | 11/2008 | Wang | |
| 7,602,780 B2 | 10/2009 | Singh et al. | |
| 2002/0053002 A1* | 5/2002 | Brandin | 711/108 |
| 2002/0087935 A1* | 7/2002 | Evans et al. | 714/799 |
| 2003/0145232 A1* | 7/2003 | Poletto et al. | 713/201 |
| 2004/0093513 A1* | 5/2004 | Cantrell et al. | 713/201 |
| 2005/0108573 A1* | 5/2005 | Bennett et al. | 713/201 |
| 2005/0132206 A1* | 6/2005 | Palliyil et al. | 713/188 |
| 2005/0262576 A1* | 11/2005 | Gassoway | 726/30 |

\* cited by examiner

*Primary Examiner* — Ponnoreay Pich
*Assistant Examiner* — John B King
(74) *Attorney, Agent, or Firm* — Cassan Maclean (57) ABSTRACT

Methods and devices for scanning an incoming datastream for a plurality of target patterns. The scanning system receives an incoming data stream and stores the stream as sequential symbols in a register array. Previously received symbols are shifted in the array as incoming symbols are shifted in. A trigger stage computes a hash value based on the k most recently received symbols. The trigger stage then uses the hash value to determine whether a more detailed symbol by symbol comparison is required between a group of sequential symbols stored in the array and a target pattern stored in external storage. This is done by comparing the hash value with the indices of the target patterns in the external storage. If the more detailed comparison is indicated, a full comparison stage retrieves the relevant target pattern and compares the target pattern with the sequentially stored symbols in the array. To improve the determination of whether the detailed comparison is required, a confidence stage may be placed between the trigger stage and the full comparison stage. The confidence stage computes a hashing function value based on c sequential symbols in the array with $c \geq k$. The hashing function value is then used to determine whether the more time consuming symbol by symbol comparison is needed.

17 Claims, 6 Drawing Sheets

DATA SCAN MECHANISM

FIELD OF THE INVENTION

The present invention relates to scanning hardware and, more specifically, relates to methods and devices for scanning an incoming data stream of symbols for matches with a predetermined set of symbol patterns.

BACKGROUND TO THE INVENTION

Data networks are fast becoming the backbone of all types of business. As such, data networks and the data that passes through them are one of the most important assets of any business. To help safeguard these assets and to properly process the data passing through them, both the incoming and the outgoing data must be scanned at ever increasing speeds to filter out unwanted content, flag important messages, and prevent unauthorized access. The scanning usually involves scanning the incoming data for patterns that may denote a virus, unwanted email, or, more importantly, a relevant message from a customer.

Conventional software scanners, unfortunately, are insufficient when it comes to scanning speed. Furthermore, they require a large expenditure in terms of both hardware and software.

Traditionally, it has been believed that a hardware solution is faster than a software solution. A desirable hardware solution would be a dedicated system that can be integrated into existing network components or, alternatively, can be built into newer models of network components. Even more ideally, such a solution would be implementable in silicon and would not require much area on a dedicated network component circuit board.

Regardless of whether such a solution is software or hardware based, one of the major pitfalls of scanning an incoming datastream is the "false positive" or a seemingly positive result that a pattern being scanned for is present in the data when, in fact, that pattern is not present. However, an even more dangerous pitfall is the "false negative"—a seemingly negative result for a pattern being scanned for when, in fact, that pattern is present. While the false positive merely sees target patterns where there are none, the false negative misses the target pattern when it is present.

Another major concern for scanning is the scan rate for negatives. This scan rate for negatives is the rate at which data can be scanned to determine whether a given data set has no chance of having a target pattern. A high scan rate means that data sets can be quickly removed from contention for the more resource consuming process of determining whether a full target pattern is present. Unfortunately, desirable high scan rates in the order of multiple gigabits of data per second are still beyond the practical limitations of software based scanning solutions.

To provide a workable scanning solution, the solution should be able to scan the data stream for multiple target patterns. Ideally, a single scan of a specified data set should be able to scan for such multiple target patterns. Performing multiple scans or passes of the data set would seriously degrade the performance of such a solution.

A further consideration to be taken into account is the size of the target patterns. If long patterns are not supported by a scanning solution, false positives are more likely to result because the patterns cannot be defined as completely.

BRIEF DESCRIPTION OF THE DRAWINGS

A better understanding of the invention will be obtained by considering the detailed description below, with reference to the following drawings in which.

DETAILED DESCRIPTION

The detailed description describes herein embodiments of methods and devices for scanning an incoming datastream for a plurality of target patterns. The scanning system receives an incoming data stream and stores the stream as sequential symbols in, according to one embodiment, a register array. Previously received symbols are shifted along the array as incoming symbols are shifted into the array. A trigger stage computes a hash value based on the k most recently received symbols where k is the minimum length of pattern being scanned for. The trigger stage then uses the hash value to index a trigger table which contains information that indicates whether a more detailed symbol by symbol comparison is required between a group of sequential symbols stored in the array and a target pattern stored in external storage. If the more detailed comparison is indicated, a full comparison stage retrieves the relevant target pattern and compares the target pattern with the sequentially stored symbols in the array. To improve the determination of whether the detailed comparison is required, a confidence stage may be placed between the trigger stage and the full comparison stage. Based on the original trigger hash value and information from the trigger table, the confidence stage reads a confidence entry from a confidence table. The confidence entry contains an expected confidence hash value and a length c. The confidence stage computes a hash value based on c sequential symbols in the array with $c \geq k$. A hash value is then computed over c symbols and compared to the expected hash value found in the confidence entry to determine whether the more time consuming symbol by symbol comparison is needed.

In one embodiment, a system for scanning an incoming data stream for a plurality of symbol patterns, the system includes:

a symbol register array for receiving said data stream and sequentially storing symbols comprising said data stream, said array shifting previously received symbols in said array as new data is received;

a trigger stage for determining a possible match between consecutive symbols in said array and a pattern stored in an external storage device, said trigger stage providing data regarding said possible match to a subsequent stage;

a full comparison stage for retrieving and comparing one of said plurality of symbol patterns with a symbol sequence stored in and retrieved from said array, said consecutive symbols being part of said symbol sequence, said one of said plurality of symbol patterns being retrieved from said external storage module when data regarding said possible match is received from a preceding stage.

In another embodiment, a method for scanning an incoming data stream of symbols for a plurality of symbol patterns, the method includes:

a) receiving said incoming data stream of symbols b) storing received symbols in an array and shifting said received symbols in said array as further incoming symbols are received;

c) determining a possible match between consecutive symbols in said array and a pattern stored in a storage device, said pattern being one of said plurality of symbol patterns;

d) in the event a possible match is indicated, performing a symbol by symbol comparison between said consecutive symbols in said array and said pattern retrieved from said storage device.

In yet another embodiment, a system for finding matches between a plurality of symbol patterns and an incoming data stream of symbols, the system includes:

a symbol register array for receiving said incoming data stream, said array storing received symbols and shifting received symbols as said data stream is received;

at least one trigger group for providing an initial indication of a possible match between a sequence of k consecutive symbols stored in said register array using a hash function applied to said sequence of consecutive symbols;

a retrieval module for retrieving said c symbols from said register array and for applying a second hashing function to selected symbols retrieved from said register array;

a confidence table module for storing entries containing values which select said c symbols and a value to be compared with results from said retrieval module;

a comparison block for comparing a result from said retrieval module with an entry from said confidence table module and for receiving output from said at least one trigger group;

a full comparison module for comparing said consecutive symbols with an entry from a storage device, said full comparison module comparing said consecutive symbols with said entry from said storage device in a symbol by symbol manner, said entry from said storage device being one of said plurality of symbol patterns wherein $c \geq k$.

Figure 1:
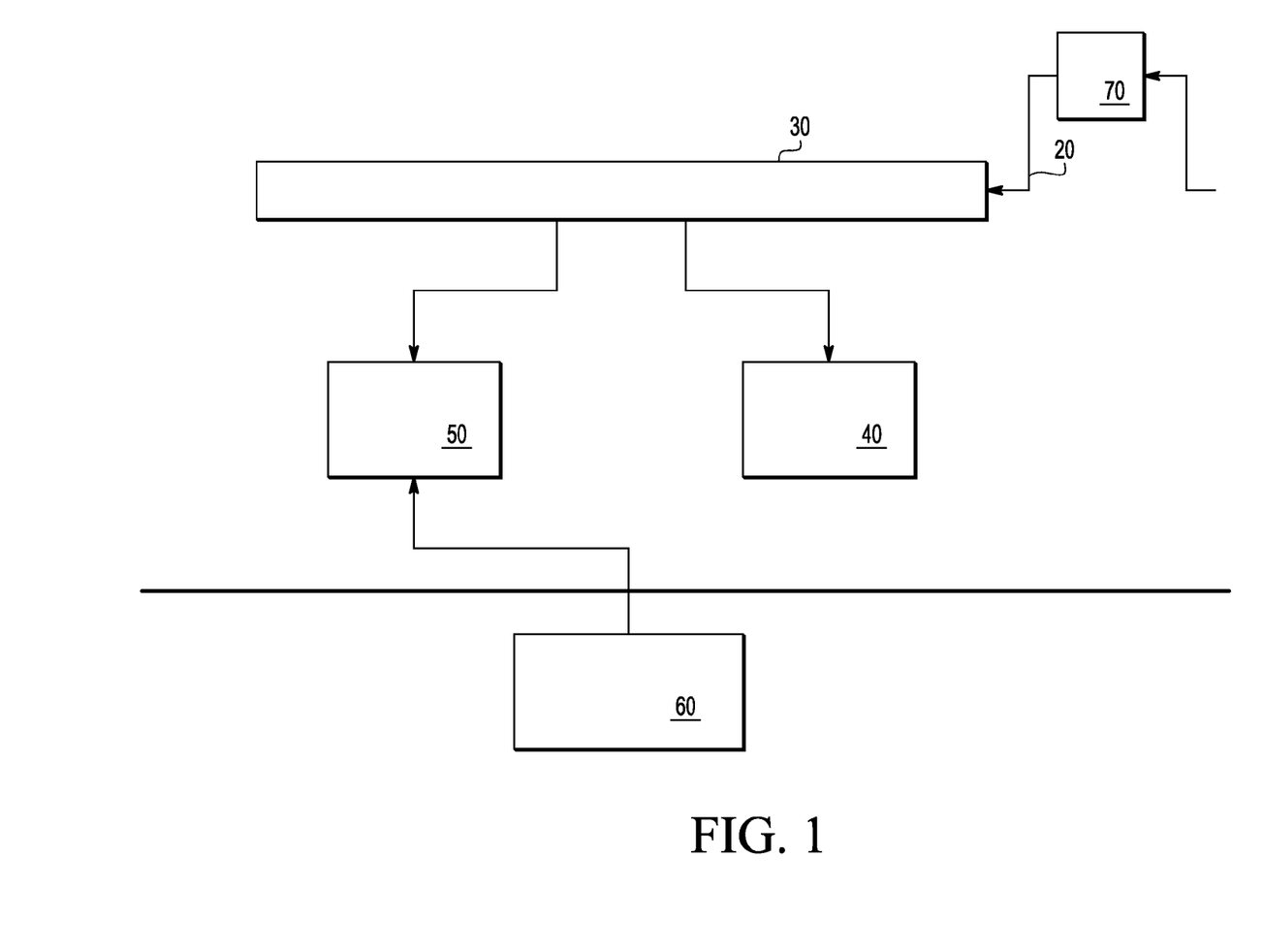
FIG. 1 is a block diagram of the invention according to a first embodiment.

Referring to FIG. 1, a system 10 for scanning an incoming data stream 20 for specific symbol patterns is illustrated. The system 10 consists of a register array 30, a trigger stage 40, and a comparison stage 50. External to the system 10 is an external storage module 60 which stores the symbol target patterns being scanned for.

The array register 30 receives the data stream 20, made up of a sequential stream of symbols, and sequentially stores the stream 20. The register array 30 shifts its contents as new symbols arrive. The register array 30 may be a well-known shift register array and it may be fed the data stream by a suitable feeding mechanism 70. The feeding mechanism 70 may be required if the data stream 20 arrives as, for example, a parallel stream. In this instance, the feeding mechanism converts the parallel stream into a serial stream.

The trigger stage 40 reads the first k symbols in the register array 30 and computes a hash value from these symbols. Based on the hash value, the system 10 determines if a more detailed examination (e.g. a symbol by symbol comparison between one of the target patterns in the storage device 60 and the symbols in the array 30) is warranted. The trigger stage 40 determines if there is enough of a similarity, based on the hash value, between the k most recently received symbols and any of the patterns stored in the storage device 60. If there is, then a more detailed comparison is warranted.

The comparison stage 50 performs the above-noted symbol by symbol comparison if a preceding stage determines that such a comparison is called for. The comparison stage 50 retrieves the possibly matching target pattern from the storage device 60 along with the relevant symbols in the array 30. These two sets of symbols are then compared to one another on a symbol by symbol bases to determine if there is a match. Only if there is a 100% match between the two groups of symbols will the comparison stage 50 indicate to the user a definitive match. Partial matches between the two groups of symbols are ignored.

It should be noted that the trigger stage 40 in the embodiment shown only calculates the hash value for a subset of the symbols stored in the array. It should also be noted that, in one embodiment, this subset is less than or equal to the number of symbols which make up the smallest target pattern. Furthermore, in one embodiment, the comparison stage retrieves a sufficient number of symbols from the array to provide for a symbol by symbol comparison with a target pattern. Thus, if a target pattern has 128 symbols, then the number of symbols upon which the hash value is based is less than 128 (e.g. 16 symbols). Similarly, if a target pattern is 128 symbols, the comparison stage retrieves the latest 128 symbols received and stored by the array 30. It should be clear that, although FIG. 1 only illustrates the comparison stage 50 as receiving data from the external storage device 60, the trigger stage 40 may, depending on its configuration, also receive data from the external storage device 60.

Figure 2:
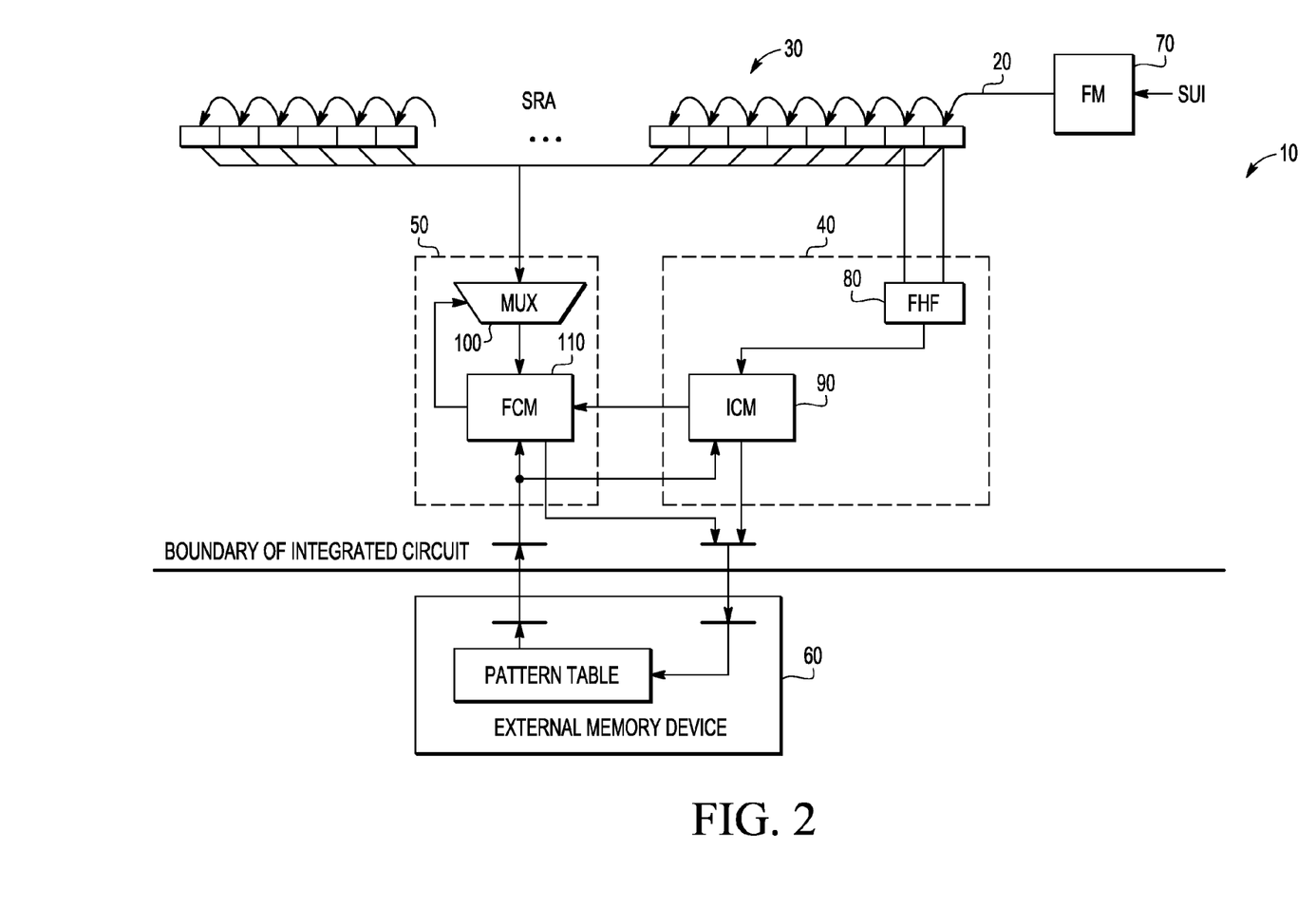
FIG. 2 illustrates a variant of the embodiment in FIG. 1 and illustrating the components in the trigger stage and the comparison stage.

Referring to FIG. 2, a possible configuration of the system 10 is illustrated. As can be seen, the trigger stage 40 in FIG. 2 has a hash function module 80 (also referred to as a hash module 80) and an initial comparison module 90. The comparison stage 50 has a multiplexer 100 and a full comparison module 110.

Referring to the trigger stage 40 in FIG. 2, the hash function module 80 reads the k most recently received symbols from the array 30 and computes a hash value from these symbols.

Once the hash value is computed, the value is passed to the initial comparison module (ICM) 90. The initial comparison module 90 then compares the hash value of the k symbols with the hash values of the target patterns stored in the external storage device 60. The ICM 90 receives the hash values of the target patterns from the external storage device 60 and, if there is a match, then the ICM 90 notifies the comparison stage 50. In the comparison stage, the full comparison module (FCM) 110 then retrieves the full target pattern whose hash value matched the hash value of the k symbols along with the relevant symbols from the array 30. These are then compared on a symbol by symbol basis. Thus, if the full target pattern has 128 bytes, the comparison stage 50 retrieves 128 bytes of the most recently received symbols and compares these with the retrieved target pattern. The symbols from the array are retrieved by way of the multiplexer 100. These symbols are then presented one symbol at a time to the FCM 110 by the multiplexer 100.

To prevent the shifting of the symbols in the array when a full comparison is required, the FCM 110 stalls or pauses the reception of new symbols into the array 30 when a symbol by symbol comparison is to be performed. This ensures that the relevant symbols are still in the array 30 when the symbols are retrieved by the multiplexer 100. Once the comparison is done, the array resumes receiving new symbols.

For the above configuration, the target patterns may be indexed in the external storage device 60 by their hash values. As such, only the index values for the target patterns are to be sent to the ICM 90 for comparison with the hash values from the HF (hash function) module 80.

In one embodiment, the hash function module 80 may be implemented as a combinational logic circuit. Similarly, the full comparison module 110 and the initial comparison module 50 may also be both implemented as combinational logic circuits implemented in an integrated circuit as part of an ASIC (application specific integrated circuit). The external storage device 60, while not part of the system, may be implemented by means of static memory circuits such as a an SRAM module. The array 30 may be implemented by means of a suitable shift register array that shifts its contents as new symbols arrive.

Figure 3:
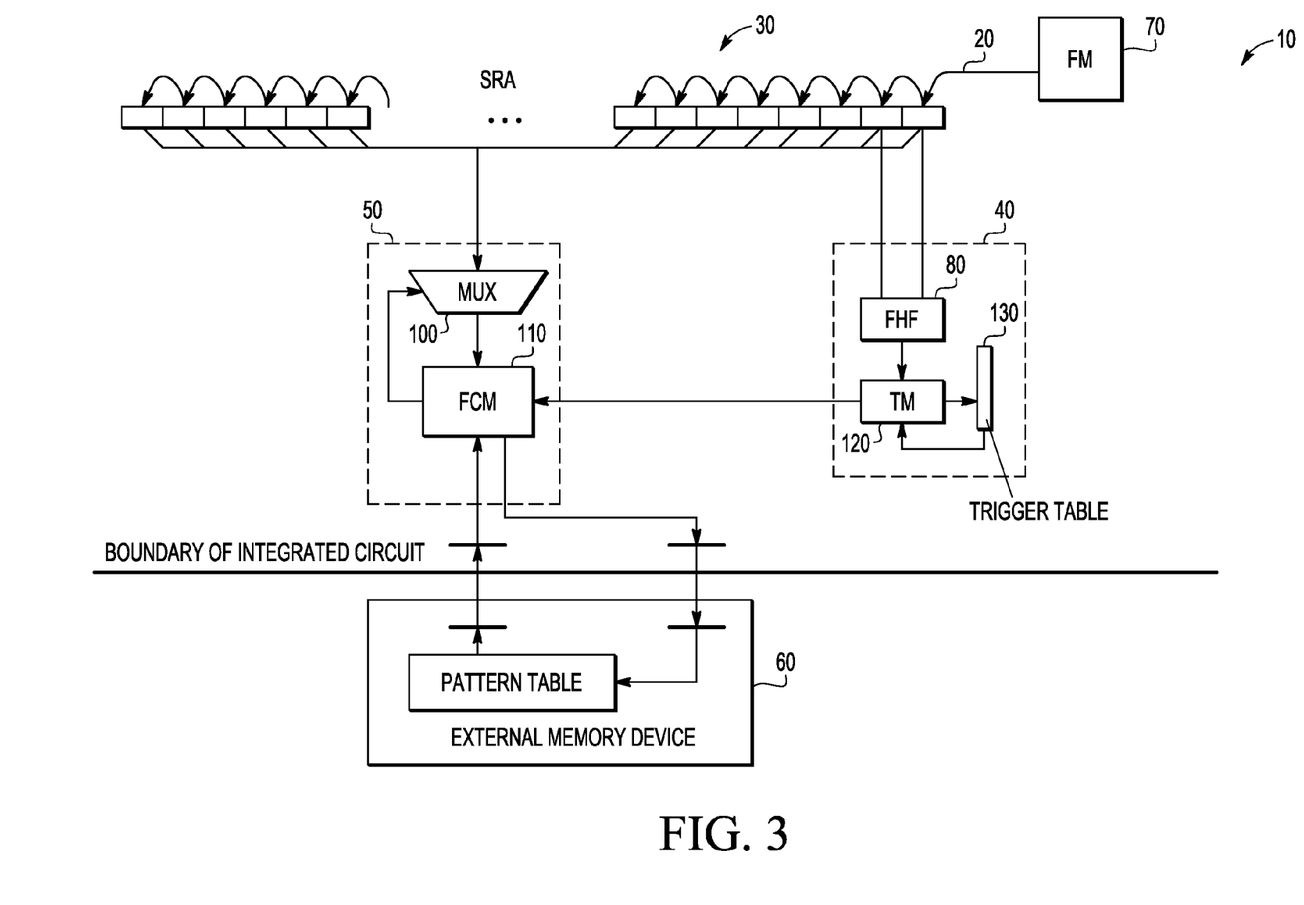
FIG. 3 illustrates a variant similar to that illustrated in FIG. 2 except that the components in the trigger stage are different.

Other configurations for the trigger stage 40 are also possible. Referring to FIG. 3, another possible configuration for the system 10 is illustrated. The system 10 in FIG. 3 is similar to the system in FIG. 2 with the notable difference that the trigger stage 40 is different. In FIG. 3, the trigger stage 40 consists of the hash function (HF) module 80, a trigger comparison module 120, and a trigger table 130. The HF module 80 has the same function as the HF module 80 in FIG. 2. The trigger comparison module 120 receives the hash value from the FHF module 80 and compares this hash value against entries in the trigger table 130. The trigger table 130 indexes its entries in accordance with the indices of the target patterns in the external storage module 60. The table 130 entries denote either a valid or an invalid entry for a specific entry in the external storage device 60. Thus, if an index A in the trigger table 130 denotes a valid entry, then indexed as A in the external storage device 60 is a valid symbol target pattern. Similarly, if the trigger table index B denotes an invalid entry, then the index B in the external storage device 60 indexes an invalid entry for index B.

The hash value from the HF module 80 is compared with the indices in the trigger table. If a match is found and if the matching entry in the trigger table denotes a valid entry, then the corresponding entry in the external storage device 60 is retrieved by the comparison stage 50 for a symbol by symbol comparison. If a matching entry in the trigger table indicates an invalid entry in the external storage device 60 then that entry is not retrieved from the external storage device 60.

Figure 4:
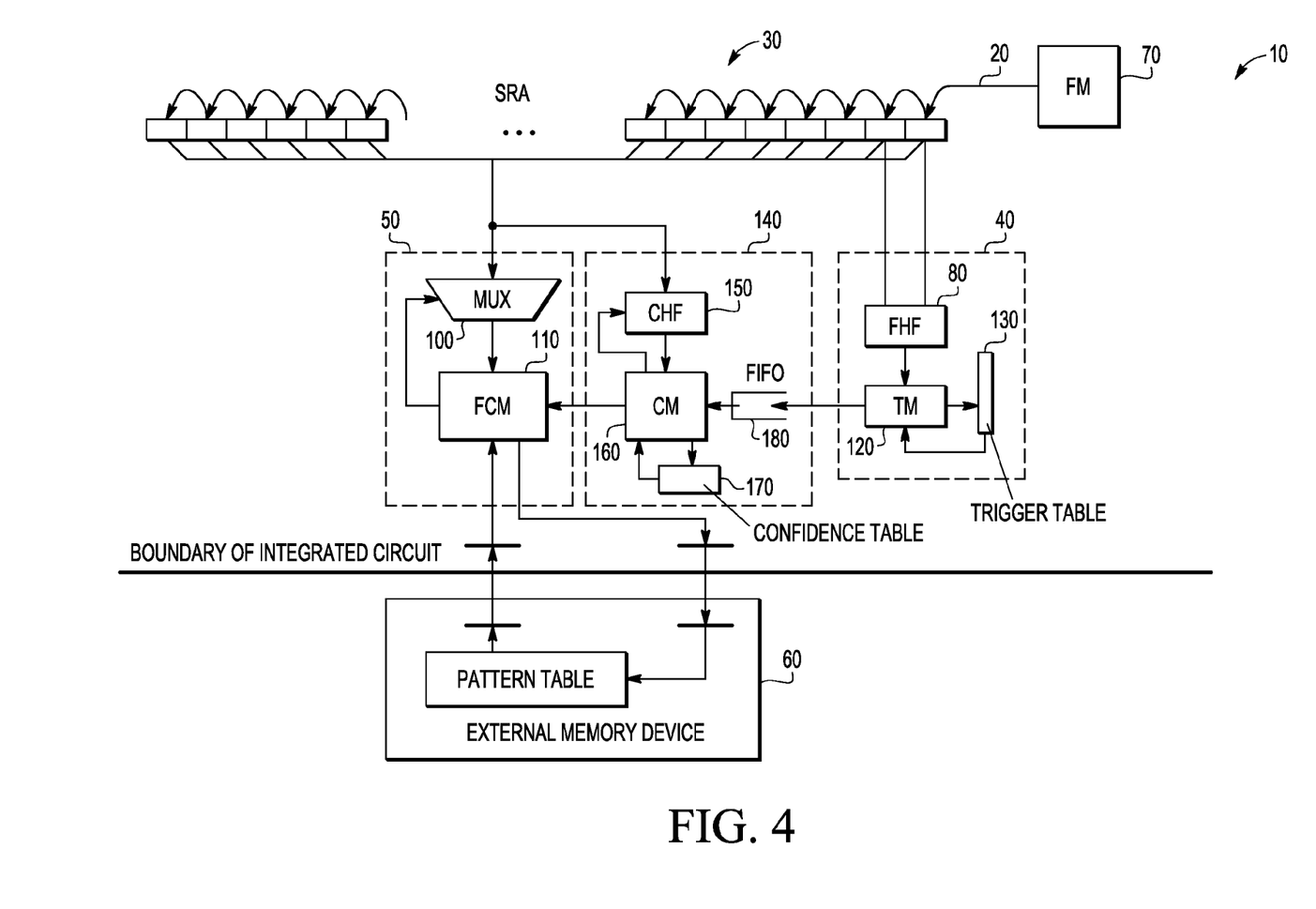
FIG. 4 illustrates a further variant of FIG. 2 with yet further different components in the trigger stage and with the addition of a confidence stage.

Referring to FIG. 4, another configuration of the system 10 is illustrated. In this configuration, a confidence stage 140 is placed between the trigger stage 40 and the comparison stage 50. The confidence stage 140 receives the output of the trigger stage 40 and, based on that output, applies a hash function to data from the array 30. If the output of the trigger stage 40 indicates that a potentially matching target pattern in the external storage device 60 is a valid entry, the confidence stage 140 calculates another hash value based on c symbols in the array 30. It should be noted that the extra hash value computed by the confidence stage may be based on a larger number of symbols than the hash value computed by the trigger stage. The confidence stage 140 provides a second and more comprehensive test for a possible match without executing a symbol by symbol comparison. If a possible match passes the confidence stage, there is a greater degree of confidence that there actually is a match between the relevant symbols in the array 30 and an entry in the external storage device.

The confidence stage 140 computes the extra hash value based on a variable number of symbols in the array. Thus, if a full target pattern is composed of 128 symbols (with each symbol being a byte), the confidence stage is able to calculate a hash value based upon up to 128 symbols.

The confidence stage, once it has computed the extra hash value based on c symbols from the array 30, then compares this extra hash value with a value stored internally and based on a specific target pattern in the external storage device 60. The result of this comparison then becomes the basis for whether a full symbol by symbol comparison is performed by the comparison stage 50.

As illustrated in FIG. 4, the confidence stage 140 has a hashing function module 150, an extra comparison block 160, and a confidence table module 170.

When the confidence stage 140 receives the output of the trigger stage 40, the confidence stage 140, based on the output of the trigger stage 40, retrieves a corresponding entry from the confidence table module 170. Part of the entry from the confidence table module 170 then determines how many symbols (the value c) will be used by the hashing function module 150 to compute a hashing function value from sequential symbols retrieved from the array 30. The hashing function value computed by the hashing function module 150 is then compared with another part of the entry from the confidence table and, if there is a match, then a full symbol by symbol comparison is warranted. If this is the case, then data regarding the possibly matching pattern is provided to the full comparison stage 50.

In one embodiment, the confidence table module 170 has two parts for each entry—a scope value indicating the "scope" of the confidence hash function and the "expected" hash value. In one embodiment, the scope value is implemented as a mask. The mask can be a bit map mask or some other method for allowing specific bits in a bit pattern to be "exposed" to a mathematical function while allowing other bits in the same bit pattern to be "shielded" from the same function. The scope value is used to determine which and how many symbols are used by the hashing function module to compute the hashing function value. The second part of the confidence table entry, the "expected" hash value or simply the value, is to be compared to the hashing function value to determine if a symbol by symbol comparison is required. It should be noted that, if the scope value is implemented as a mask in the form of a bit map mask, differing entries may have differing masks. The differing masks may be different not only in the number of symbols masked off but also in the mask pattern used.

The hashing function module 150 (also referred to as the retrieval module) receives from the extra comparison block 160 an indication of which symbols to retrieve from the array 30 and the mask to apply to these symbols. Once the mask has been applied to the consecutive symbols retrieved from the array 30, the hashing function is applied to the resulting masked pattern. The hashing function value obtained is then passed to the extra comparison block 160 for comparison with the second part of the retrieved entry from the confidence table 170. The hashing function or retrieval module 150 may retrieve up to x symbols from the array 30, x being the number of symbols in a full target pattern. However, by using the mask or the scope value from the entry from the confidence table, only c symbols are used to determine the hashing function value. It should be noted that $k \leq c \leq x$ where k is the number of consecutive symbols used to calculate the hash value used by the trigger stage 40.

The extra comparison block 160 receives the output of the trigger stage 40 and, based on this output, retrieves an entry from the confidence table 170. The block 160 then sends part of the entry to the hashing function module 150 along with the data which determines which symbols to retrieve from the array 30. The block 160 receives, in return, the hashing function value from the hashing function module 150. This value is then compared by the comparison block 160 with part of the entry from the confidence table 170. If there is a match, then an identification of the possibly matching target pattern and an identification of the relevant symbols in the array 30 are sent to the full comparison stage 50.

To further explain the above, an example will be provided. For the example, it will be assumed that the array 30 has 512 elements with addresses A0-A511. It can also be assumed that k=16 and x=128. Thus, the trigger stage 40 examines symbols in elements A0-A15. If the trigger stage indicates a possible match between consecutive symbols in the array 30 and the entry at index I, this index is passed to the confidence stage 140. Once received by block 160, the entry in the confidence table corresponding to index I is retrieved. The mask in the entry is passed to the hashing function module 150. The hashing function module 150 then retrieves, in this example, the 128 most recently received symbols in the array 30 as the array 30 stalls or pauses when the trigger stage 40 indicates a possible match. Should a skewed trigger stage be used with multiple trigger groups (as will be described below), the identification of the relevant addresses of symbols to be retrieved from the array 30 is also received by the hashing function module 150. For this example, the symbols in array addresses A0-A127 are retrieved by the hashing function module 150. Using a bit map mask with c=64, all the elements from the retrieved 128 symbols are masked off except for the first 64 symbols (i.e. symbols from addresses A0-A63). It should be noted that the mask need not mask off sequential symbols or end symbols in the pattern. Other masks which mask off the middle elements or non-sequential symbols in the group may be used. Once the symbols from array addresses A0-A63 are obtained, a hash function is applied to these symbols by the hashing function module. The resulting hashing function value is sent to the comparison block 160 and is compared to the second part of the retrieved entry from the confidence table. If there is a match, then the index I is sent to the full comparison stage 50. If there is no match, then the array 30 is restarted from its paused state and the index I is discarded by the confidence stage 140.

While the above description contemplates pausing or stalling the array 30 when the trigger stage detects a possible match, this is not the most efficient method. As illustrated in FIG. 4, a FIFO (first in, first out) buffer 180 may be placed as part of the confidence stage 140 to receive incoming data about possible matches from the trigger stage 40. To assist the confidence stage 140 and the full comparison stage 50 in retrieving the proper elements from the array 30, a universal counter that increments every time a new symbol or a group of symbols is placed in the array 30 may be implemented. In the system illustrated in FIG. 4, new symbols are introduced into the array 30 one at a time. Since the trigger stage 40 only has a single trigger group (a trigger group being defined as comprising a hash function module, a trigger comparison module, and a trigger table), then the symbols being examined start at address A0. If there is a possible match, the trigger stage 40 passes not only the index I for the possible match (indicating which pattern the symbols in the array may match) but also the counter value when the possible matching pattern was found. The hashing function module 150 receives this counter value from the comparison block 160 which originally received it from the trigger stage 40. The hashing function module 150 then checks the current counter value and, based on this, the proper elements can be retrieved. As an example, if the counter value is 50 when a possible match was found, this value is queued in the buffer 180 along with the matching index I. When the hashing function module 150 receives this value for the counter, it checks the present counter value. If the present counter value is, say, 59, then the difference between the present counter value and the counter value when the possible match was detected provides the location of the possibly matching elements in the array 30. In this example, if the present counter value is 59, then 9 symbols have been entered in the array 30 since the possible match was detected. Thus, instead of retrieving elements from array addresses A0-A127 (if 128 symbols are to be retrieved), the hashing function module 150 retrieves symbols in array addresses A9-A137. A similar process may be used by the full comparison stage to retrieve the relevant symbols in the array 30 is a full symbol by symbol comparison is warranted.

Figure 5:
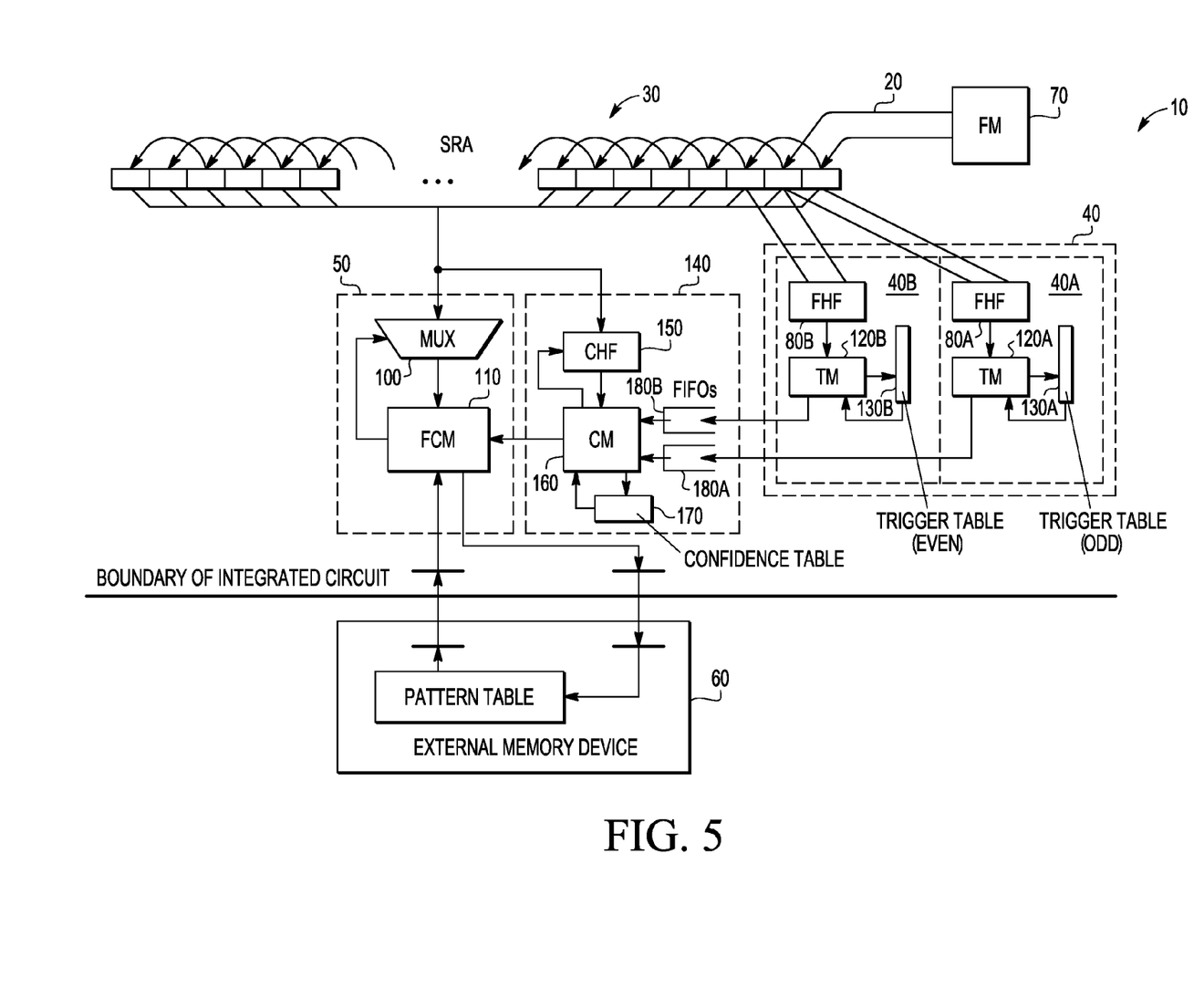
FIG. 5 illustrates a variant of the embodiment in FIG. 4 with the trigger stage having multiple trigger groups.

Referring to FIG. 5, another variant of the system 10 is illustrated. The variant in FIG. 5 is similar to that in FIG. 4 except that the trigger stage 40 has two trigger groups 40A, 40B with corresponding FIFO buffers 180A, 180B and the array 30, instead of receiving one symbol at a time, receives two symbols from the mechanism 70. In cases where the trigger stage is the performance limiter, this can double the performance.

The register array 30 in FIG. 5 receives two incoming symbols per sequence. Thus, instead of array address A0 having a new symbol, array addresses A0 and A1 receive new symbols. Also, each shift of the array 30 shifts by two places such that the symbol in A0 will be shifted to address A2 while the symbol in address A1 will be shifted to address A3.

The above-noted multiple placement shifting takes into account the two trigger groups in the trigger stage 40. Each trigger group 40A, 40B has a corresponding hash function module 80A, 80B that applies a hash function to the k symbols retrieved from the array 30. Also, each trigger group 40A, 40B has corresponding trigger comparison modules 120A, 120B and corresponding trigger tables 130A, 130B. Each trigger group scans a different portion of the array 30 in an offset manner. Thus, if 16 symbols are scanned by each trigger group, trigger group 40A scans symbols in array addresses A0-A15 while trigger group 40B scans symbols in array addresses A1-A16. If a possible match is found, then, using the universal counter concept explained above, the counter value when a possible match is found is sent along with the index I. The hashing function module 150, depending on which FIFO buffer it receives the data from, will know to offset the calculations. Again taking the example given above, if the counter is set at 50 when a possible match is found by trigger group 80B scanning array addresses A1-A16, the hashing function module 150 will accordingly compensate. Thus, if the universal counter is at 61 when the possible match has to be retrieved from the array 30, the hashing function module 150 will retrieve symbols from addresses A12-A139, if 128 symbols are being retrieved. The formula for the starting point addresses for retrieval is therefore scanning starting point address in array+[present counter value−counter value when match was found]

Thus, if the trigger group 80A starts at array address A0 then its scanning starting point is at 0 while trigger group 80B is at scanning starting point 1.

It should be noted that while FIG. 5 illustrates using two identical trigger groups 40A, 40B and two identical FIFO buffers 180A, 180B, other configurations using more than two identical trigger groups can be used. However, it should be further noted that increasing the number of parallel, identical trigger groups, may, in some embodiments, be accompanied by a corresponding increase in not only the number of symbols being inserted into the array 30 per cycle, but also in the number of positions that symbols are shifted in the array and the number of FIFO buffers. As an example, if 4 identical and parallel trigger groups are to be implemented, then 4 symbols should be inserted per cycle and each symbol should be shifted by 4 array spots per cycle. Thus, a symbol in array address A0 should, for the next cycle, be in address A4. Similarly, a symbol in array address A1 should be in array address A5 after one shift. The array elements being scanned by the 4 trigger groups may, in some embodiments, also be staggered to ensure that no sequential combinations of incoming symbols are missed. As such, if each trigger group reads/scans 16 symbols, then trigger group A always scans array addresses A0-A15, trigger group B scans array addresses A1-A16, trigger group C scans array addresses A2-A17, and trigger group D scans array addresses A3-A18. To retrieve the relevant symbols from the array 30, the counter scheme outlined above may be used with trigger groups A, B, C, and D having scanning starting points 0, 1, 2, and 3 respectively.

Figure 6:
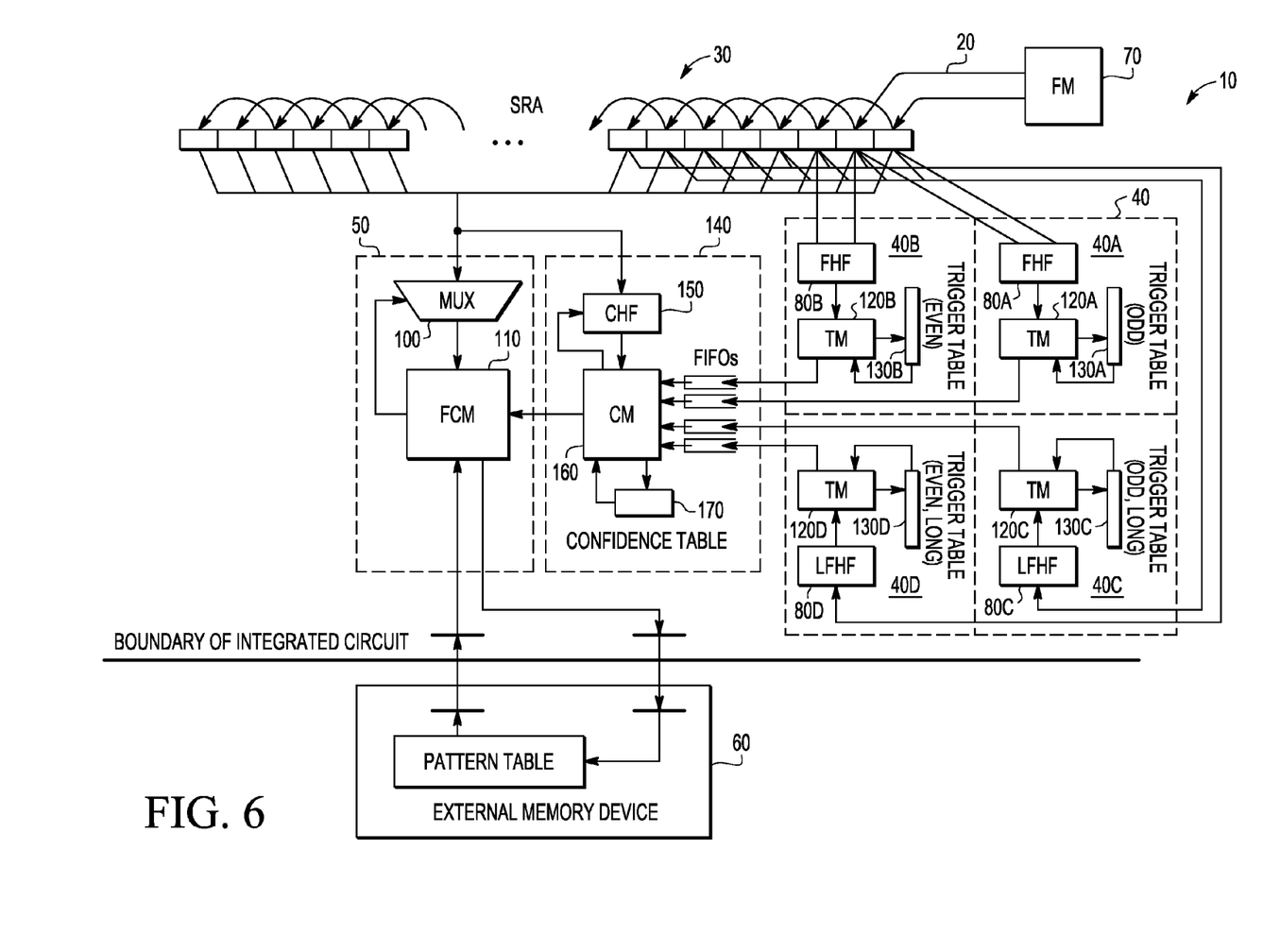
FIG. 6 illustrates a variant of the embodiment in FIG. 5 with the trigger stage having multiple trigger groups with differing symbol scan lengths.

Referring to FIG. 6, another embodiment of the system 10 is illustrated. As can be seen, the system 10 is similar to that illustrated in FIG. 5 with the exception that, instead of having two trigger groups in the trigger stage 40, 4 trigger groups are used. It should be noted that these 4 trigger groups, trigger groups 40A, 40B, 40C, and 40D, are not identical to one another. Trigger groups 40A, 40B are similar to the trigger groups 40A, 40B in FIG. 5 but trigger groups 40C, 40D are not. Trigger groups 40C, 40D perform the same function as trigger groups 40A, 40B but, instead, scan longer sequences of symbols in the shift array 30. As an example, trigger groups 40A, 40B may scan 16 symbols each, with trigger group 40A scanning array addresses A0-A15 while trigger group 40B scans array addresses A1-A16. The trigger groups 40C, 40D may scan, as an example, 64 symbols each, each trigger group scan being offset from the other. Thus, from the above example, trigger group 40C may scan array addresses A0-A63 while trigger group 40D may scan array addresses A1-A64. As can be discerned from the above, the symbols being scanned by trigger group 40C overlaps that being scanned by trigger group 40A. Similarly, the symbols being scanned by trigger group 40D overlaps those being scanned by trigger group 40B. Such an overlap is necessary to ensure that groups of symbols are not skipped during the scanning process, especially if trigger groups scanning different group sizes of symbols are used.

Regarding the structure of trigger groups 40C, 40D, their structure is similar to that of trigger groups 40A, 40B. Each trigger group has a trigger table, a hash function module that applies a hash function to the symbols from the array 30, and a comparison module for comparing the result of the hash function module with entries from the trigger table. The only difference, other than perhaps the entries in the trigger tables, between the trigger groups 40A, 40B and the trigger groups 40C, 40D, is that trigger groups 40C, 40D receive a larger sequence of symbols and apply the hash function to this longer set of symbols.

Trigger groups 40C, 40D have hashing function module 80C, 80D that applies a hashing function to longer sequences of symbols than the hashing function module 80A, 80B. This long hashing function (LHF) module 80C, 80D pass the resulting data to the comparison module 120C, 120D. The comparison module 120C, 120D compare the data received from the LHF module 80C, 80D with entries from the tables 130C, 130D. If there is a possible match, the counter value corresponding to when the possible match was found, along with the table index, is sent to the confidence stage 140. At the confidence stage 140, each trigger group has a corresponding FIFO buffer and the contents of each buffer is handled based on which trigger group it corresponds to.

As noted above, there are many possible combinations of the number of and type of trigger groups in the trigger stage. Trigger groups may be configured to receive/retrieve any number of symbols from the array 30 and there may be multiple identical trigger groups or multiple non-identical trigger groups in a trigger stage 40.

The different hashing function modules in the different stages and trigger groups may be implemented as combinational circuits or as application specific integrated circuits (ASICs). The various trigger tables and the confidence table may be implemented as static RAM sections in the general system.

While the principles of the invention have been described above in connection with specific apparatus, it is to be clearly understood that this description is made only by way of example and not as a limitation on the scope of the invention.

A person understanding this invention may now conceive of alternative structures and embodiments or variations of the above all of which are intended to fall within the scope of the invention as defined in the claims that follow.

We claim:

1. A system for scanning an incoming data stream for a plurality of symbol patterns, the system comprising:
   a microprocessor;
   a symbol register array for receiving said data stream and sequentially storing symbols comprising said data stream, said symbol register array shifting previously received symbols in said symbol register array as new data is received;
   a trigger stage for determining, using the microprocessor, a possible match between consecutive symbols in said symbol register array and a pattern stored in a storage device, the pattern containing x symbols, said trigger stage providing data regarding said possible match to a subsequent stage, wherein said trigger stage comprises at least one trigger group, each trigger group comprising:
      a hash module for calculating a hash value based on k consecutive symbols stored in said symbol register array, wherein k<x, and wherein k is less than the number of symbols in the smallest one of the symbol patterns, said hash module reading said k consecutive symbols from said symbol register array;
      a trigger table; and
      a trigger comparison module for comparing results from said hash module with indices of entries in said trigger table, said trigger table having entries indicative of whether a specific entry in said storage module is a valid entry, said results from said hash module being compared with indices of said entries in said trigger table; and
   a full comparison stage for retrieving and comparing one of said plurality of symbol patterns with a symbol sequence stored in and retrieved from said symbol register array, said consecutive symbols being part of said symbol sequence, said one of said plurality of symbol patterns being retrieved from said storage device when data regarding said possible match is received from a preceding stage.

2. A system according to claim 1 wherein said system further comprises a confidence stage for determining if a possible match determined by said trigger stage should be passed to said full comparison stage, the confidence stage receiving an output of said trigger stage and providing an output to said full comparison stage.

3. A system according to claim 2 wherein said confidence stage retrieves c symbols from predetermined addresses in said symbol register array based on said output of said trigger stage, wherein k<c<x, and applies a hash function to said c symbols to result in a hashing function value, said hashing function value being compared to an entry in said confidence stage, said possible match being passed to said full comparison stage if said hashing function value matches said entry.

4. A system according to claim 2 wherein said confidence stage comprises :
- a hashing function module for calculating an extra hash value based on consecutive symbols stored in said symbol register array, said consecutive symbols being received from said symbol register array by said hashing function module;
- a confidence table module for storing values to be compared with results from said hashing function module, each entry in said table module having a larger corresponding entry in said storage device
- an extra comparison block for comparing results from said hashing function module and an entry stored in said confidence table module, results from a comparison of said hashing function value and said entry stored in said confidence table module being indicative of a possible match or non-match between said larger corresponding entry in said storage device and said consecutive symbols in said symbol register array.

5. A system according to claim 4 wherein each entry in said confidence table module includes a scope value for use by said hashing function module in calculating said extra hash value.

6. A system according to claim 5 wherein said scope value is a mask for masking out at least a predetermined one of said consecutive symbols prior to applying said hashing function to said consecutive symbols.

7. A system according to claim 1 wherein said trigger stage comprises a plurality of the trigger groups, each trigger group reading a group of consecutive symbols different from consecutive symbols read by other trigger groups.

8. A system according to claim 7 wherein at least one of said plurality of trigger groups reads a number of consecutive symbols different from a number of consecutive symbols read by other trigger groups.

9. A system according to claim 7 wherein said confidence stage further comprises a plurality of buffers, each one of said plurality of buffers corresponding to and receiving an output of a specific one of said plurality of trigger groups.

10. A system according to claim 1 wherein said full comparison stage compares said symbol sequence with said one of said symbol patterns in a symbol by symbol manner.

11. A system according to claim 10 wherein said full comparison stage comprises:
- a full comparison module for comparing said symbol sequence with said one of said plurality of symbol patterns in a symbol by symbol manner, said full comparison module receiving said one of said plurality of symbol patterns from said storage device;
- a retrieval module for retrieving said symbol sequence from said symbol register array and for sending said symbol sequence to said full comparison module.

12. A method for scanning an incoming data stream of symbols for a plurality of symbol patterns, the method comprising:
- a) receiving said incoming data stream of symbols;
- b) storing received symbols in an array and shifting said received symbols in said array as further incoming symbols are received;
- c) determining, using a microprocessor, a possible match between consecutive symbols in said array and a pattern stored in a storage device, the pattern containing x symbols, said pattern being one of said plurality of symbol patterns, by calculating a hash value based on k consecutive symbols in said array, wherein k<x, and wherein k is less than the number of symbols in the smallest one of the symbol patterns, and comparing said hash value with entries indicative of whether a specific entry in said storage device is a valid entry; and
- d) in the event a possible match is indicated, performing a symbol by symbol comparison between said consecutive symbols in said array and said pattern retrieved from said storage device.

13. A method according to claim 12 further comprising a determining step of determining if a possible match determined in step c) necessitates a symbol by symbol comparison between said consecutive symbols in said array and said pattern in said storage device.

14. A method according to claim 13 wherein said determining step comprises calculating a hash value based on said symbols in said array and comparing said hash value with a stored value.

15. A system for finding matches between a plurality of symbol patterns and an incoming data stream of symbols, the system comprising:
- a microprocessor;
- a symbol register array for receiving said incoming data stream, said symbol register array storing received symbols and shifting received symbols as said data stream is received;
- at least one trigger group for providing, using the microprocessor, an initial indication of a possible match between the received symbols stored in the symbol register array and a particular one of the symbols patterns containing x symbols, said initial indication based on a sequence of k consecutive symbols stored in said symbol register array, wherein k<x, and wherein k is less than the number of symbols in the smallest one of the symbol patterns, using a hash function applied to said sequence of k consecutive symbols;
- a retrieval module for retrieving c symbols from said symbol register array, wherein k<c<x, and for applying a second hashing function to selected ones of said c symbols retrieved from said symbol register array when said at least one trigger group provides the initial indication of the possible match;
- a confidence table module for storing entries containing values which select said c symbols based on an output from said at least one trigger group and, which select a value to be compared with results from said retrieval module;
- a comparison block for comparing a result from said retrieval module with an entry from said confidence table module and for receiving said output from said at least one trigger group; and
- a full comparison module for comparing x symbols retrieved from the symbol register array with an entry from a storage device corresponding to the particular symbol pattern, said entry being the particular symbol pattern, said full comparison module comparing said x symbols with said entry from said storage device in a symbol by symbol manner.

16. A system according to claim 15 wherein said system comprises a plurality of trigger groups, each trigger group reading a group of consecutive symbols different from consecutive symbols read by other trigger groups.

17. A system according to claim 15 wherein said storage device is an external storage device.

* * * * *

UNITED STATES PATENT AND TRADEMARK OFFICE
CERTIFICATE OF CORRECTION

| | | |
|---|---|---|
| PATENT NO. | : 8,001,602 B2 | Page 1 of 1 |
| APPLICATION NO. | : 11/261480 | |
| DATED | : August 16, 2011 | |
| INVENTOR(S) | : John Pillar et al. | |

It is certified that error appears in the above-identified patent and that said Letters Patent is hereby corrected as shown below:

Column 10, line 23 (Claim 1, line 3) the text "a microprocessor" should read --at least one integrated circuit--.

Column 10, line 28 (Claim 1, line 9) the text "the microprocessor" should read --the at least one integrated circuit--.

Column 11, line 62 (Claim 12, line 8) the text "a microprocessor" should read --at least one integrated circuit--.

Column 12, line 22 (Claim 15, line 4) the text "a microprocessor" should read --at least one integrated circuit--.

Column 12, lines 27 and 28 (Claim 15, lines 9-10) the text "the microprocessor" should read --the at least one integrated circuit--.

Signed and Sealed this
Eleventh Day of October, 2011

David J. Kappos
*Director of the United States Patent and Trademark Office*